(12) United States Patent
White

(10) Patent No.: US 7,275,690 B1
(45) Date of Patent: Oct. 2, 2007

(54) SYSTEM AND METHOD OF DETERMINING UNPROCESSED ITEMS

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 234 days.

(21) Appl. No.: 11/173,842

(22) Filed: Jul. 1, 2005

(51) Int. Cl.
*G06F 19/00* (2006.01)

(52) U.S. Cl. ........................... 235/385; 235/383

(58) Field of Classification Search ............... 235/385, 235/383, 378, 375, 382, 382.5; 340/572.1
See application file for complete search history.

(56) References Cited

U.S. PATENT DOCUMENTS

| | | | | |
|---|---|---|---|---|
| 7,114,656 B1* | 10/2006 | Garver | ................... | 235/462.46 |
| 2004/0118916 A1* | 6/2004 | He | ............................... | 235/383 |
| 2005/0242953 A1* | 11/2005 | Nakagawa et al. | ...... | 340/572.1 |
| 2006/0208169 A1* | 9/2006 | Breed et al. | ................. | 250/221 |
| 2006/0266824 A1* | 11/2006 | Hassenbuerger | ............ | 235/383 |
| 2007/0023513 A1* | 2/2007 | Andreasson et al. | ........ | 235/385 |

\* cited by examiner

*Primary Examiner*—Thien Minh Le
(74) *Attorney, Agent, or Firm*—Paul W. Martin; Priest & Goldstein, PLL

(57) ABSTRACT

A system and method of determining unprocessed items which is used to verify an item count based upon the number of radio frequency identification labels that have responded with their label information. The system includes an imaging system for producing image information about items in a container, and a computer for receiving label information from a radio frequency identification label reader following interrogation of a number of radio frequency identification labels on the items in the container, for producing a first count of the items from label information obtained from the number of radio frequency identification labels, for producing a second count of the items in the container from the image information, and for comparing the first count to the second count to produce a third count of the items not processed by the radio frequency identification label reader.

20 Claims, 3 Drawing Sheets

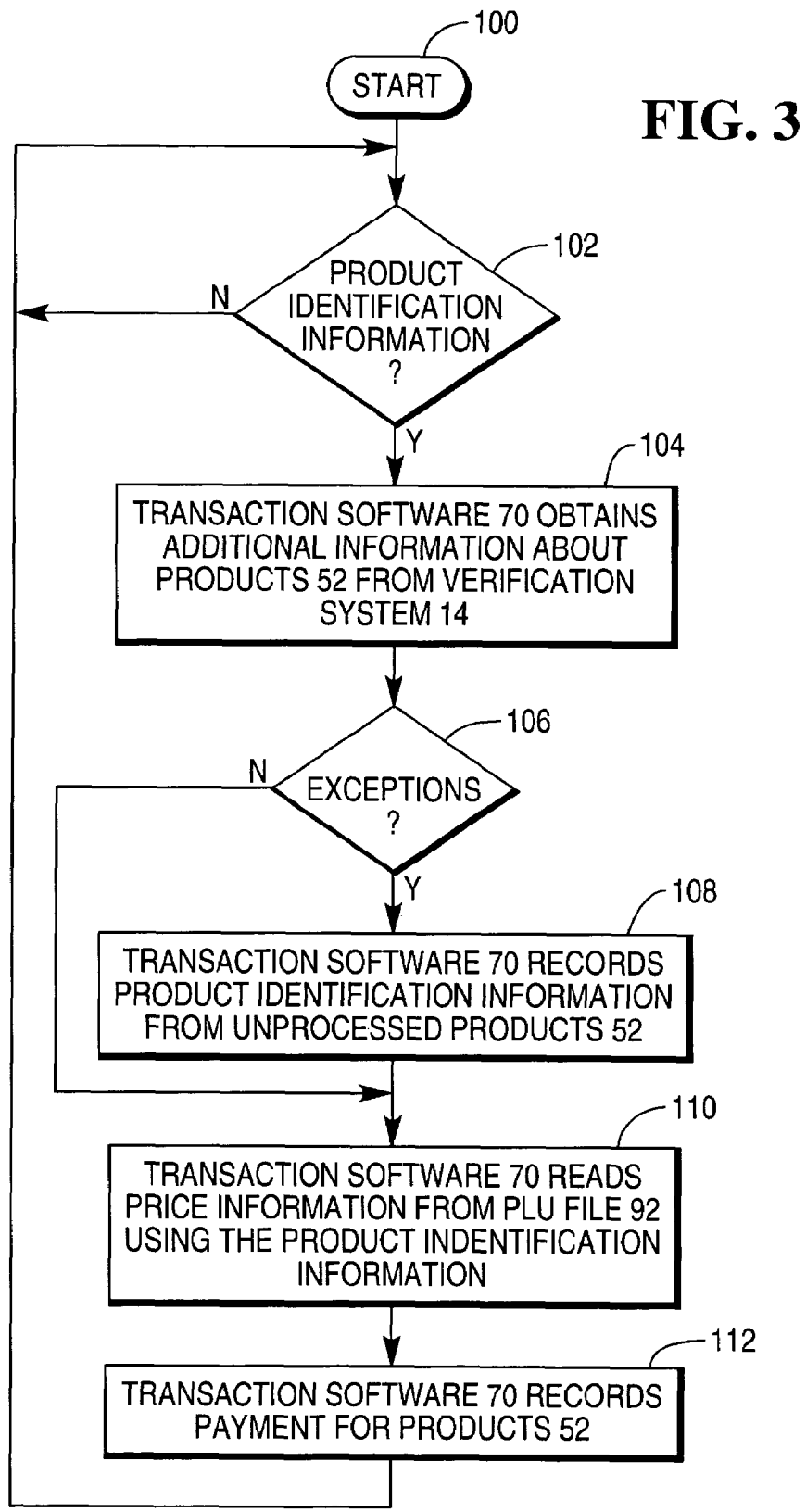

SYSTEM AND METHOD OF DETERMINING UNPROCESSED ITEMS

BACKGROUND

Radio frequency identification (RFID) technology provides an alternative to bar code reader technology for distinguishing and recording items for purchase. RFID may result in labor savings to retailers, since it may obsolete conventional methods of identifying items.

One proposed method of processing items with RFID labels is to read the RFID labels in batch. For example, the processing method would include reading RFID labels on items while the items remain in a shopping cart, palette, or packaging.

Technical limitations make this method of processing impractical. Numerous materials, including metals and liquids, can shield radio frequency (RF) energy. RFID labels can be damaged. Finally, RFID labels may be defective due to low yield rates.

Therefore, it would be desirable to provide a system and method of determining unprocessed items.

SUMMARY

A system and method of determining unprocessed items is provided.

The system includes an imaging system for producing image information about items in a container, and a computer for receiving label information from a radio frequency identification label reader following interrogation of a number of radio frequency identification labels on the items in the container, for producing a first count of the items from label information obtained from the number of radio frequency identification labels, for producing a second count of the items in the container from the image information, and for comparing the first count to the second count to produce a third count of the items not processed by the radio frequency identification label reader.

BRIEF DESCRIPTION OF THE DRAWINGS

FIG. 3 is a flow diagram illustrating a transaction processing method.

DETAILED DESCRIPTION

Figure 1:
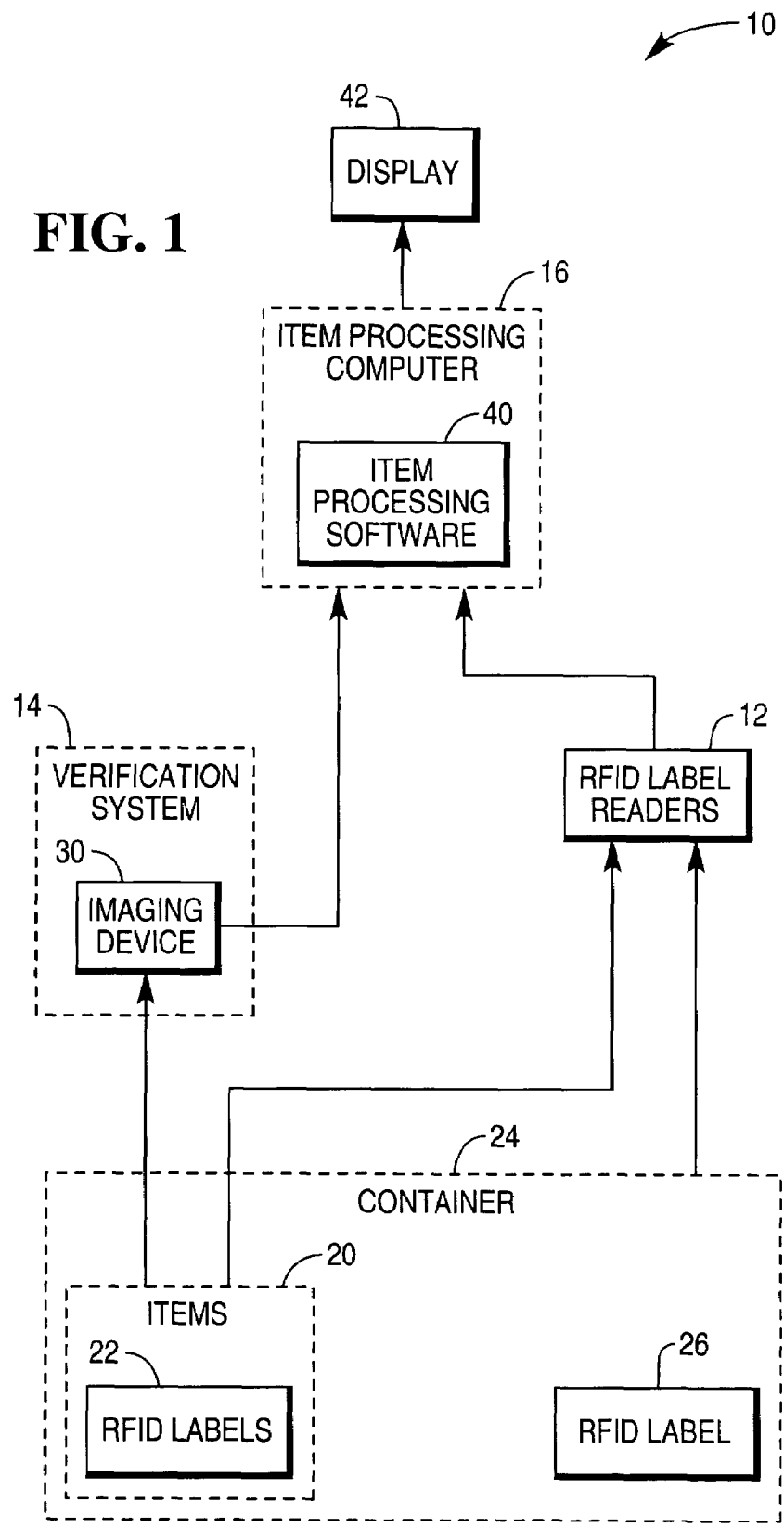
FIG. 1 is a block diagram of an item processing system.

Referring now to FIG. 1, item processing system 10 primarily includes radio frequency identification (RFID) readers 12 and verification system 14.

RFID label readers 12 for reading RFID labels 22 on items 20 in batch, i.e., RFID readers 12 may be used to read RFID labels on items 20 in container 24 while items 20 remain in container 24. Container 24 may include a shopping cart, palette, packaging, or other grouping of items 20.

RFID label readers 12 emit interrogation signals and receive return signals from RFID labels 22. RFID label readers 12 may be network peripherals. As such, RFID label readers 12 transfer the item information read from RFID labels 22 to an item processing computer 16.

RFID label readers 12 may also read an RFID label 26 on container 24, if one is present.

RFID labels 22 store identification information which identifies items 20 or may be used to identify items 20. RFID labels 22 may additionally store other information.

Verification system 14 obtains additional information about items 20 that would facilitate counting items 20 while items 20 remain in container 24. For this purpose, verification system 14 may include one or more imaging devices 30. For example, verification system 14 may include an X-ray machine operating in the x-ray frequency band, or a Terahertz pulsed imaging system, such as one manufactured by TeraView Ltd, of Cambridge, United Kingdom.

Other types of imaging devices 30 are also envisioned, including but not limited to infrared, thermal, ultraviolet, and magnetic resonance. A charge coupled device (CCD) imaging device may also be used if all items 20 in container 24 are visible.

In one example method of operation, imaging devices 30 capture images containing RFID labels 22. Special materials 28 not usually present in consumer items may be added to RFID labels 22 before they are affixed to items 20 to simplify capturing them in images. Phosphorous or luminous materials at various light spectra may be used to highlight the presence of RFID labels 22. Some types of special materials 28 may go away over time or when exposed to washing. When applied to RFID labels 22 on or in clothing, these types of special materials 28 could also give a store a means to know that the associated item had been washed before it was returned.

Item processing computer 16 executes item processing software 40, which receives identification information from RFID labels 22 and may additionally identification information from RFID label 26, if present, to identify container 24. Item processing computer 16 determines a first count of items 20 from the identification information received from RFID labels 22.

Item processing software 40 further receives additional information about items 20 from verification system 14. Item processing software 40 applies digital signal processing techniques and then performs a simple calculation to obtain a second count of items 20.

In one example method of operation, item processing software 40 identifies items 20 by identifying their RFID labels 22. One method of identifying RFID labels 22 is to identify special materials applied to RFID labels 22. Another method of identifying RFID labels 22 is to identify antenna patterns of RFID labels 22. Antenna patterns vary by vendor, but they have unique shape and size characteristics which make them fairly distinct and easily discernable by item processing software 40.

In an another example method of operation, item processing software 40 may count items 20 to determine whether more items 20 are present than were processed. For example, items 20 may be specially arranged on an input belt so that item processing software 40 may apply digital signal processing techniques to identify the specially arranged items 20 in an image captured by a CCD imaging device.

Item processing software 40 initiates an exception process to handle discrepancies between the count it determines based upon information received from RFID label readers 12 and the count it determines based upon information from verification system 14. Failure to read an RFID label 32 may be a result of the RFID label 32 being shielded, damaged, nonfunctional, or missing. Item processing software 40 may alert an operator to any exceptions through display 42.

If item processing software 40 determines that one or more items 20 were not successfully identified, item processing software 40 may display a message requiring container 24 to make another pass by RFID label readers 22. For certain types of containers 34, such as shopping carts, item processing software 40 may require that only the unidentified items 20 be singled out and processed. For example, item processing software 40 may display all items 20 that were processed. An operator may then manually attempt to process items 20 that might have been missed. For a small number of items 20 this may be acceptable, but for a large number of items 20, reprocessing all items 20 may be the best option.

Figure 2:
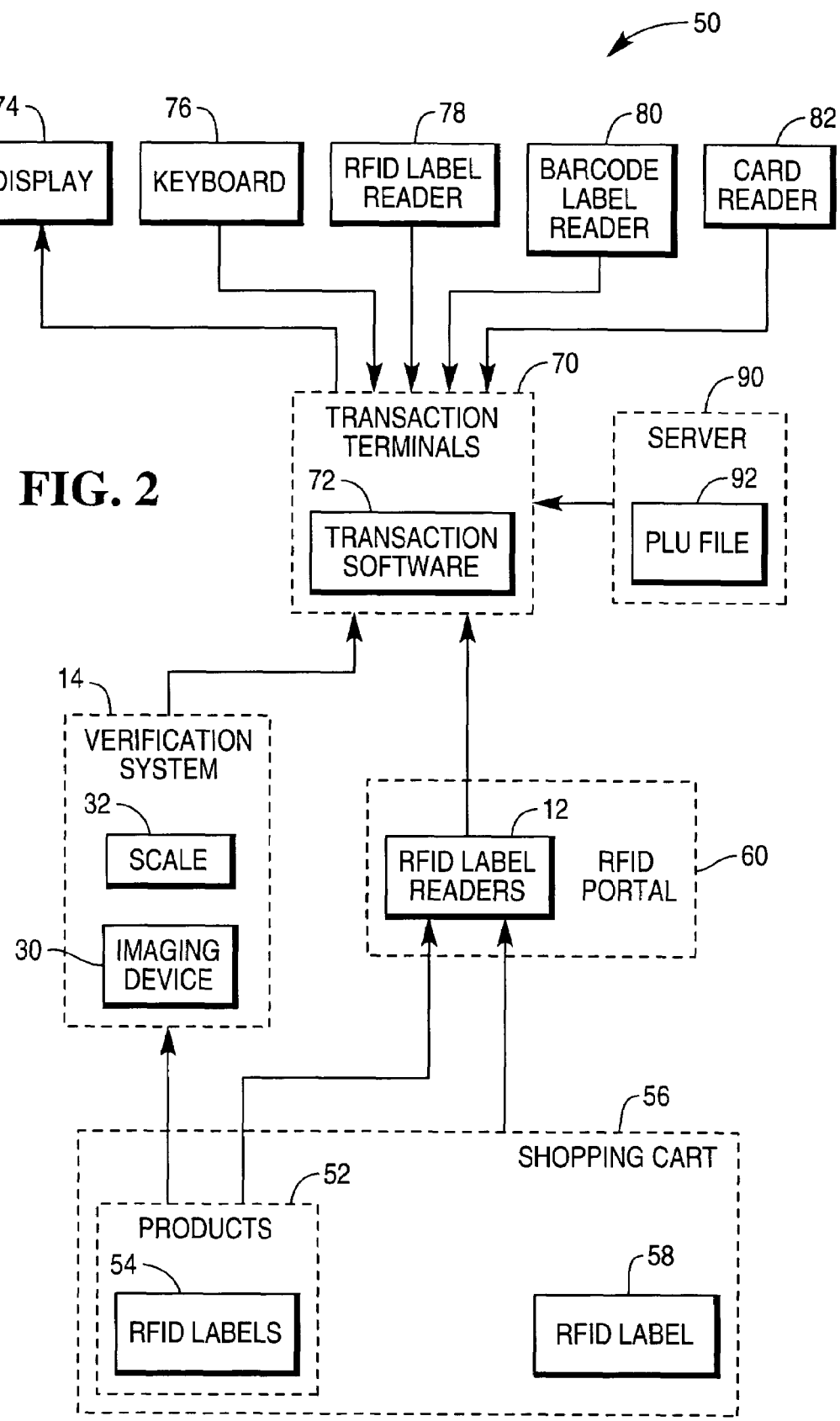
FIG. 2 is a block diagram of an example item processing system including a transaction processing system.

Referring now to FIG. 2, an example transaction processing system 50 is illustrated.

Transaction processing system 50 includes RFID label readers 12 for reading RFID labels 54 on products 52. RFID labels 54 store information about products 52. Products 52 are located in shopping cart 56. RFID label readers 12 may also read RFID label 58 on shopping cart 56.

RFID label readers 12 may be organized into an RFID portal 60. Such an RFID portal 60 may take a variety of possible shapes. For example, RFID portal 60 may resemble an inverted U shape for increasing chances of successfully reading RFID labels 54 as shopping cart 56 passes through.

Other types and shapes of RFID portals 60 are also envisioned for warehouses and other environments. Establishing a minimum clearance between shopping cart 56 reduces the risk of reading RFID labels 54 of other shopping carts 56.

In this example embodiment, item processing computer 16 of FIG. 1 is replaced by one or more transaction terminals 70. Transaction terminals 70 execute transaction software 72 for completing payment for products 52.

In addition to imaging device 30, verification system 14 may further include scale 32 for weighing items 52 and shopping cart 56. Transaction software 72 may use weight information to verify that all products 52 have either been identified or not identified. Transaction software 72 determines the weights of identified products 52 from item PLU file 92 and compares the total weight products 52 with measured weight less shopping cart weight.

If transaction software 72 determines that one or more products 52 were not successfully identified by RFID readers 12, transaction software 72 may display a message to an operator on display 74 requiring reprocessing all of products 52 in shopping cart 56, or transaction software 72 may display a message requiring reprocessing of only the unidentified products 52. An operator may use RFID label reader 78 for this purpose. If products 52 also have barcode labels, the operator may use barcode label reader 80 to process unidentified products 52. Finally, the operator may manually enter information about unidentified products 52 using keyboard 76. If reprocessing is necessary, other customers waiting in line may be routed to other transaction terminals 70 following passage through RFID portal 60.

After all products 52 have been identified, transaction software 72 completes the transaction by determining price information associated with the product information from PLU file 92, and processing payment.

Customers may complete payment in any conventional manner, cash, charge, debit, or otherwise. Each of transaction terminals 70 includes card reader 82 for completing payment by card.

Transaction server 90 stores PLU file 92.

With reference to FIG. 3, the method of operation of transaction software 72 is illustrated in more detail beginning with START 100.

In step 102, transaction software 70 waits for label information from RFID label readers 12. Operation proceeds to step 104.

In step 104, transaction software 70 obtains additional information about products 52 from verification system 14.

In step 106, transaction software 70 determines whether exceptions exist. Transaction software 70 determines a first count of products 52 from the label information, determines a second count of products 52 from the additional information, and compares the first count to the second count to determine whether exceptions exist. If so, operation continues to step 108. Otherwise, operation proceeds to step 110.

In step 108, transaction software 70 records product identification information from unprocessed products 52 under control of an operator of transaction terminal 70, either directly via keyboard 76, or indirectly using RFID label reader 78 or barcode label reader 80. Alternatively, transaction software 70 may record product identification information from all products 52 in shopping cart 56 under control of the operator.

In step 110, transaction software 70 reads price information from PLU file 92 using the product identification information.

In step 112, transaction software 70 records payment for products 52 through any conventional manner, including payment by cash, or by card through card reader 82. Operation returns to step 102 to wait for another customer.

Although particular reference has been made to certain embodiments, variations and modifications are also envisioned within the spirit and scope of the following claims.

The invention claimed is:

1. An item processing system comprising:
   an imaging system for producing image information about items collectively in a container, the items remaining in the container during the producing of imaging information; and
   a computer for receiving label information from a radio frequency identification label reader following interrogation of a number of radio frequency identification labels on the items in the container, for producing a first count of the items from label information obtained from the number of radio frequency identification labels, for producing a second count of the items in the container from the image information, the second count being produced by processing of image information for the items, processing including resolving image information representing different ones of the items from image information for the items collectively, and for comparing the first count to the second count to produce a third count of the items not processed by the radio frequency identification label reader.

2. The item processing system of claim 1, wherein the imaging system comprises an X-ray system.

3. The item processing system of claim 1, wherein the imaging system comprises a Terahertz pulsed imaging system.

4. The item processing system of claim 1, wherein the imaging system comprises an infrared system.

5. The item processing system of claim 1, wherein the imaging system comprises an ultraviolet system.

6. The item processing system of claim 1, wherein the imaging system comprises a magnetic resonance system.

7. The item processing system of claim 1, wherein the imaging system senses materials responsive to radiation applied to the items.

8. The item processing system of claim 1, wherein the imaging system captures an image of antennas of the radio frequency identification labels.

9. The item processing system of claim 1, wherein the computer is also for obtaining subsequent label information from the radio frequency identification label reader following a subsequent interrogation of a subsequent number of the radio frequency identification labels to produce a new count of items based on radio frequency identification label information and comparing the new count of items based on radio frequency identification label information to the second count to produce a new discrepancy count indicating a discrepancy between the new count of items based on radio frequency label information and the second count, if the third count is not equal to zero.

10. The item processing system of claim 9, wherein the computer is also for individually obtaining item identification information from the items following removal of the items from the container if the new discrepancy count is not equal to zero.

11. An item processing method comprising:
 obtaining label information from a radio frequency identification label reader following interrogation of a number of radio frequency identification labels on items in a container by an item processing computer;
 producing a first count of the items from the label information by the item processing computer;
 obtaining image information about the items in the container from an imaging system by the item processing computer, the image information being obtained as the items remain assembled in the container;
 producing a second count of the items in the container from the image information by the item processing computer, the second count being produced by processing of the image information for the items, processing including resolving image information representing different ones of the assembled items; and
 comparing the first count to the second count to produce a third count of the items not processed by the radio frequency identification label reader.

12. The item processing method of claim 11, wherein the obtaining image information step comprises obtaining an X-ray image of the items from an X-ray system.

13. The item processing method of claim 11, wherein the obtaining image information step comprises obtaining an Terahertz pulsed image of the items from a Terahertz pulsed imaging system.

14. The item processing method of claim 11, wherein the obtaining image information step comprises obtaining an infrared image of the items from an infrared imaging system.

15. The item processing method of claim 11, wherein the obtaining image information step comprises obtaining an ultraviolet image of the items from an ultraviolet imaging system.

16. The item processing method of claim 11, wherein the obtaining image information step comprises obtaining a magnetic resonance image of the items from a magnetic resonance imaging system.

17. The item processing method of claim 11, wherein the obtaining image information step comprises obtaining an image of the items following application of materials responsive to radiation to the items.

18. The item processing method of claim 11, wherein the obtaining image information step comprises capturing an image of antennas of the radio frequency identification labels.

19. The item processing method of claim 11, further comprising:
 obtaining subsequent label information from the radio frequency identification label reader following a subsequent interrogation of a subsequent number of the radio frequency identification labels on the items in the container by the item processing computer;
 producing a new count of the items from the subsequent label information, the new count indicating the number of items as indicated by the subsequent label information, by the item processing computer; and
 comparing the new count to the second count to produce a new discrepancy count of the items not processed by the radio frequency identification label reader, the new discrepancy count indicating a discrepancy between the number of items as indicated by the subsequent label information, and the second count.

20. The item processing method of claim 19, further comprising individually obtaining item identification information from the items following removal of the items from the container if the new discrepancy count is not equal to zero.

* * * * *